Nov. 17, 1970     L. BUSH     3,540,079
APPARATUS FOR CORRUGATING SHEET MATERIAL
Filed Jan. 30, 1968     6 Sheets-Sheet 1

INVENTOR
LOUIS BUSH
BY
ATTORNEYS

Nov. 17, 1970  L. BUSH  3,540,079
APPARATUS FOR CORRUGATING SHEET MATERIAL
Filed Jan. 30, 1968  6 Sheets-Sheet 3

INVENTOR
LOUIS BUSH
BY
Kane Dalsimer, Kane, Sullivan & Smith
ATTORNEYS

INVENTOR
LOUIS BUSH
BY
ATTORNEYS

Nov. 17, 1970            L. BUSH            3,540,079

APPARATUS FOR CORRUGATING SHEET MATERIAL

Filed Jan. 30, 1968            6 Sheets-Sheet 6

INVENTOR
LOUIS BUSH
BY
*Kane, Dalsimer, Kane, Sullivan & Smith*
ATTORNEYS

United States Patent Office 3,540,079
Patented Nov. 17, 1970

3,540,079
APPARATUS FOR CORRUGATING SHEET MATERIAL
Louis Bush, Jamesport, N.Y., assignor to Flanders Filters Inc., Riverhead, N.Y., a corporation of New York
Filed Jan. 30, 1968, Ser. No. 701,661
Int. Cl. B29c 17/04; B31f 1/24, 1/36; D29f 11/12
U.S. Cl. 18—19                                      10 Claims

ABSTRACT OF THE DISCLOSURE

A corrugating machine wherein a plurality of transversely spaced parallel ribs from a supporting surface for a sheet of material to be corrugated. A vacuum is generated at the underside of the sheet to draw the sheet into firm engagement with the ribs. The transverse spacing of the ribs is variable, such that when the spacing is reduced the sheet is drawn into the area between adjacent ribs to form corrugations therein.

BACKGROUND AND SUMMARY OF THE INVENTION

This invention relates to an apparatus for corrugating a sheet of pliable material such as paper, plastic, metal foil, or certain textiles. The corrugation of such materials is desirable to obtain greater strength and rigidity, and in some cases, to provide a pleasing appearance.

Sheet material is conventionally corrugated on machines having rotating drums with interlocking gear teeth or corrugations. The material is passed between the drums and thereby deformed into the cross-sectional shape of the boundary between the interlocking teeth. Kraft paper is commonly corrugated in this manner for use as the cushioning layer in corrugated paper cartons. While many materials may be satisfactorily corrugated by the above method, a great many other materials may not since they lack the necessary tensile strength to withstand deformation imparted by the teeth of the corrugating drums. Such materials simply pull apart or crack when corrugation by the conventional method is attempted.

A particular example of a material which cannot be satisfactorily corrugated by presently known methods is a paper of the type commonly used in high efficiency air filters. Such filters, called "absolute" or "HEPA" filters in the industry, utilize filter paper having the ability to remove up to 99.97% of the .3 micron sized particles from the air. Papers of this type, as well as papers having a somewhat lower efficiency, are typically made from the fibers of glass, glass-asbestos, or ceramic. In certain applications, such paper also includes a small percentage of commercial "binder" to provide added strength and water resistance.

In a broad sense, this invention relates to an apparatus for corrugating a sheet of pliable material. The apparatus includes a surface for supporting a sheet of the material which comprises a plurality of transversely spaced parallel ribs. Vacuum trays are positioned on the underside of the surface for drawing the sheet into firm engagement with the ribs. By then reducing the transverse spacing between the ribs, the sheet is drawn into the area between the adjacent parallel ribs to form longitudinal corrugations therein.

It is an object of the present invention to provide an apparatus which is capable of corrugating a sheet of material having low tensile strength and low resistance to deformation. It is also an object of this invention to provide an apparatus capable of continuously corrugating an endless sheet of material wherein the corrugations run the length of the sheet. It is a further object of this invention to provide an apparatus which can perform the above corrugating operation at a speed sufficient to meet commercial production demands.

It is also another object of the present invention to provide an apparatus for corrugating material which requires a minimum of attention during its operation, is simple in design, and inexpensive to manufacture.

DESCRIPTION OF THE PREFERRED EMBODIMENT

Figure 1:
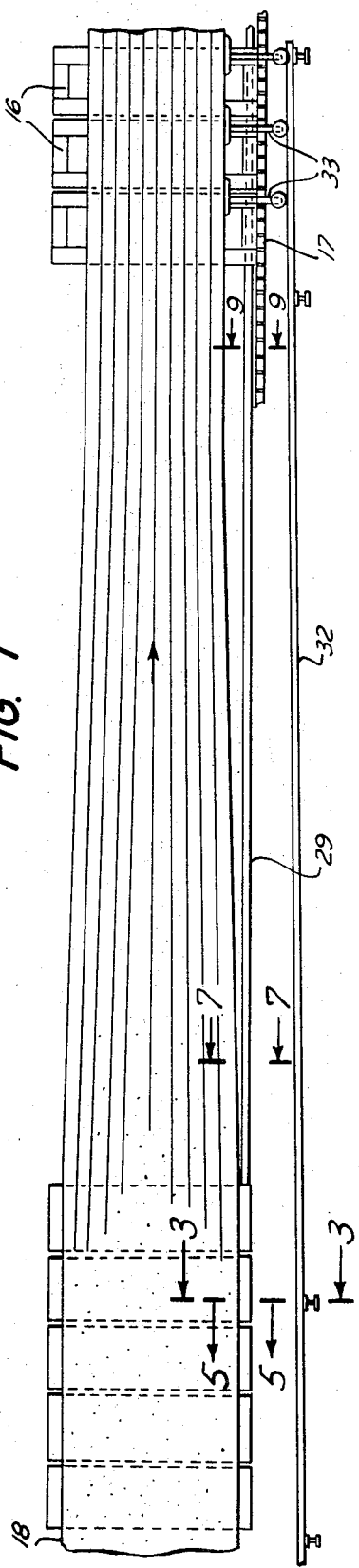
FIG. 1 is a schematic plan view illustrating the overall layout of the apparatus of the subject invention.
Figure 2:
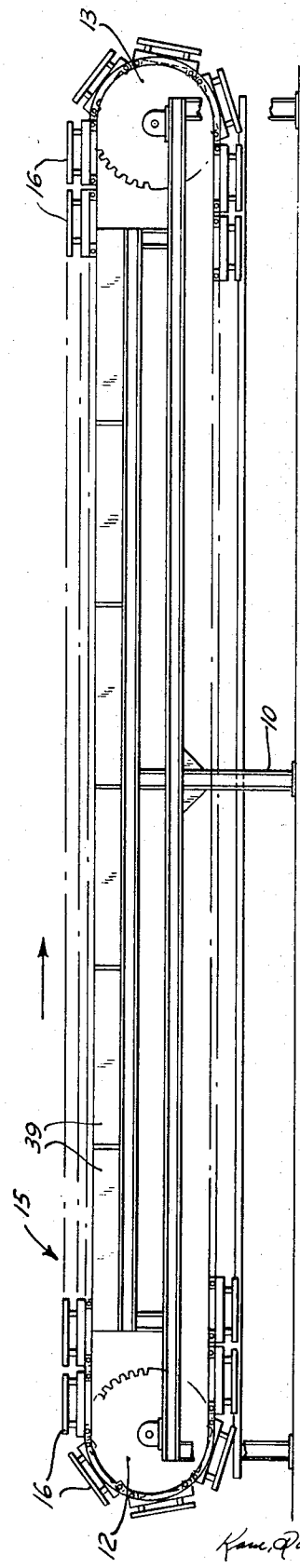
FIG. 2 is a schematic side view of the apparatus.

Referring to the drawings, FIGS. 1-2 illustrate the general layout of the apparatus of the present invention. For purposes of clarity, no attempt has been made to illustrate all the details of the machine in these two figures. Only the details necessary to permit an understanding of the overall operation have been shown. Also, it should be understood that the proportions as illustrated are not meant to be controlling.

The apparatus is mounted on a frame 10 which is made up of suitable structural beams for supporting the various components of the machine. A rotatable sprocket 12 is mounted at one end (hereinafter called "front") of the frame and a similar sprocket 13 is mounted at the opposite "rear" end. A segmented endless belt 15 is positioned about the two sprockets such that the top portion thereof as seen in FIG. 2 forms a substantially horizontal upper surface. The belt 15 comprises a plurality of individual segments 16 which are joined by a continuous chain 17. The chain 17 in turn engages the teeth of the two sprockets such that upon rotation of one of the sprockets, the chain 17 and the endless belt 15 also rotate.

In a typical application of the subject invention, the machine is positioned at the end of a Fourdrinier paper-making machine. The Fourdrinier machine, which would be positioned adjacent the front end of the corrugating machine, feeds the paper 18 directly onto the horizontal upper surface formed by the endless belt 15. Alternatively, the paper may be fed from the Fourdrinier machine through a preliminary drying apparatus before being placed on the upper surface. Rotation of the belt 15 causes the paper to move from the front end to the rear end during which the corrugating operation, as hereinafter further described, is performed. The speed of the belt should generally correspond to the rate at which the paper is received from the Fourdrinier machine such that a continuous manufacturing operation results. The paper is removed at the rear end of the corrugating machine where suitable cutting or folding operations may be performed.

Figure 3:
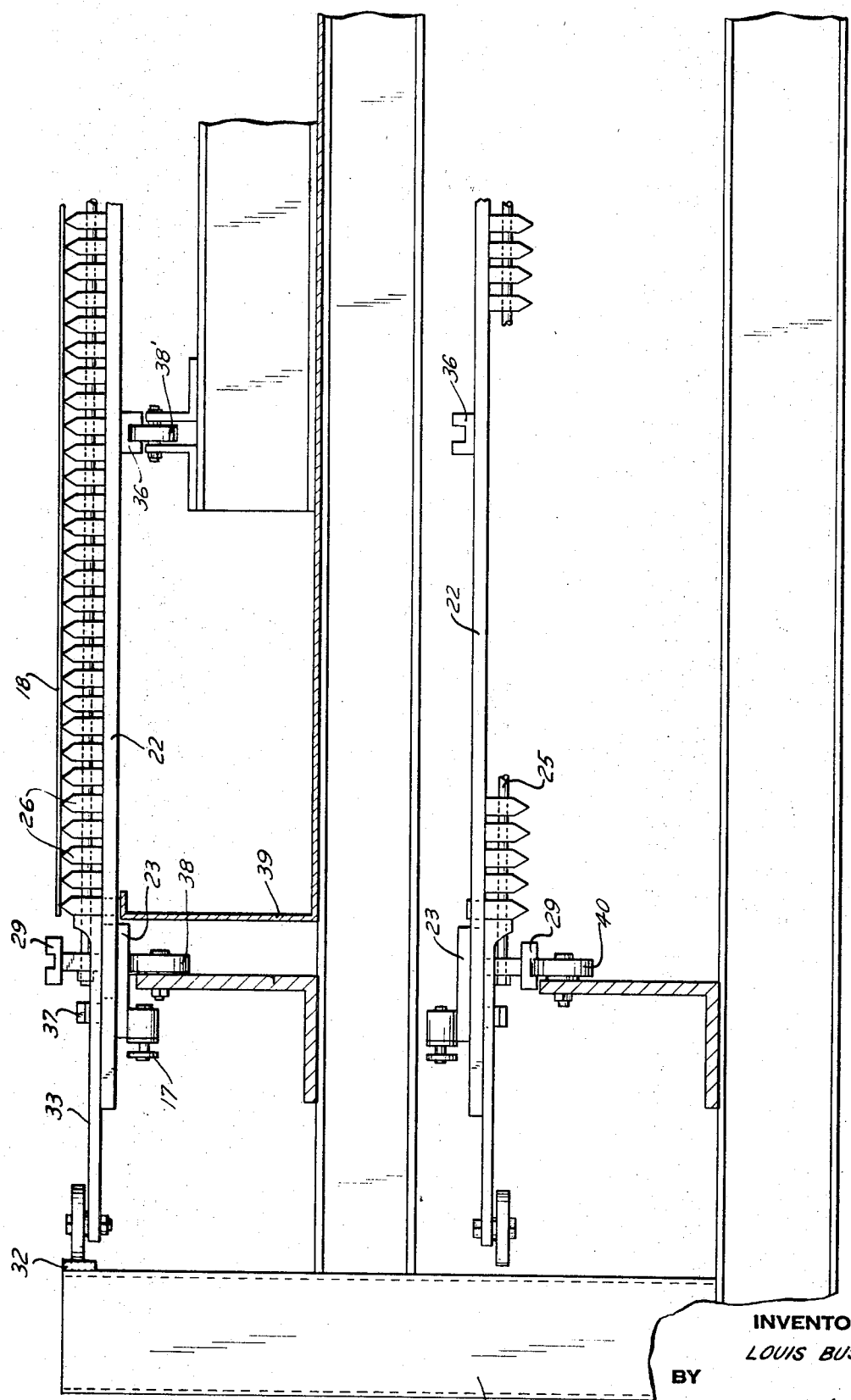
FIG. 3 is a partial end section taken along the line 3—3 of FIG. 1.
Figure 4:
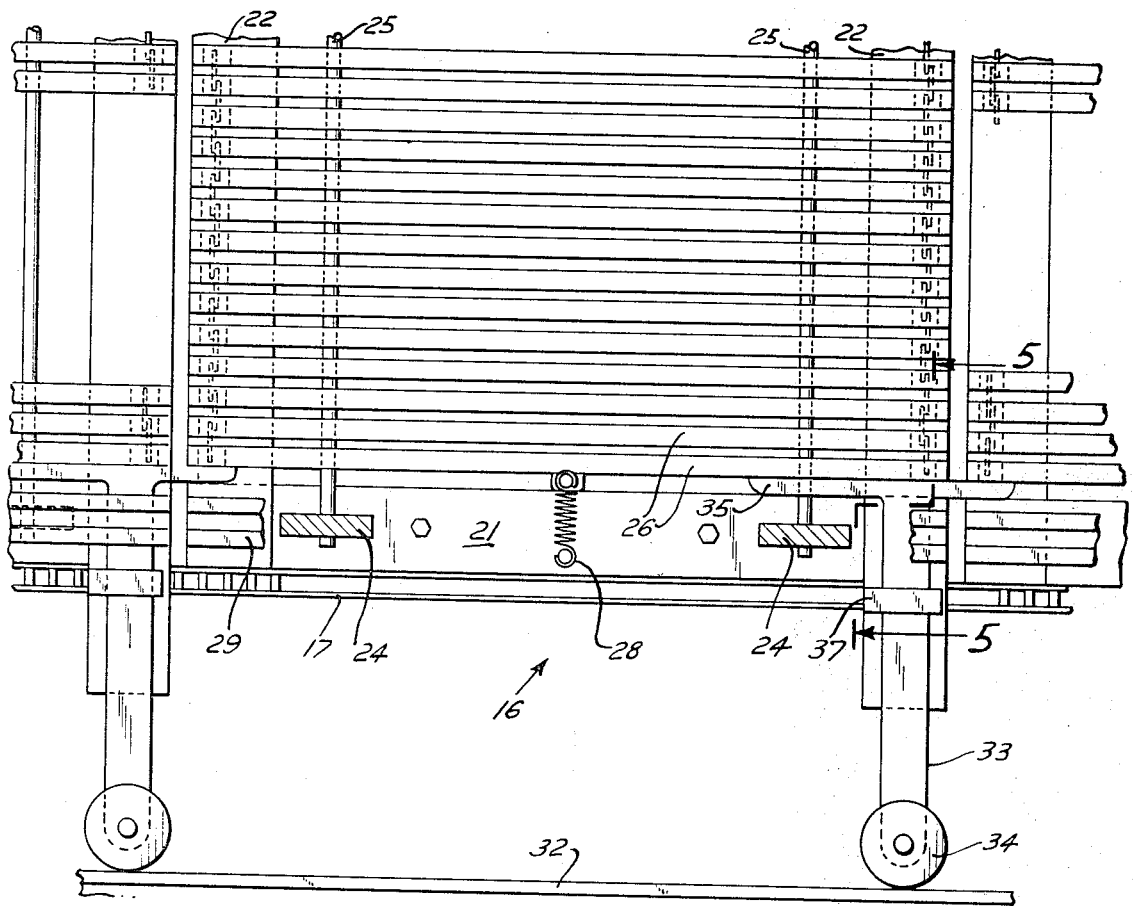
FIG. 4 is a fragmentary plan view illustrating the ribs in their extended position.
Figure 5:
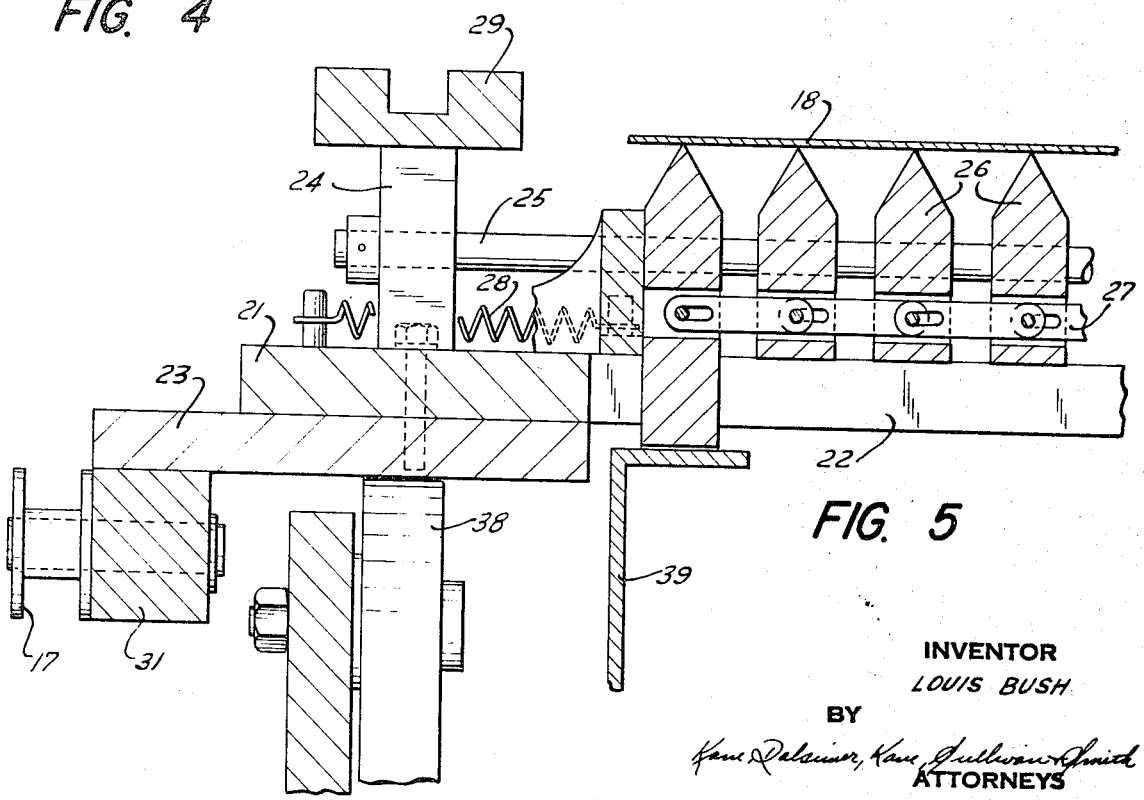
FIG. 5 is a partial end section taken along the line 5—5 of FIGS. 1 and 4.
Figure 6:
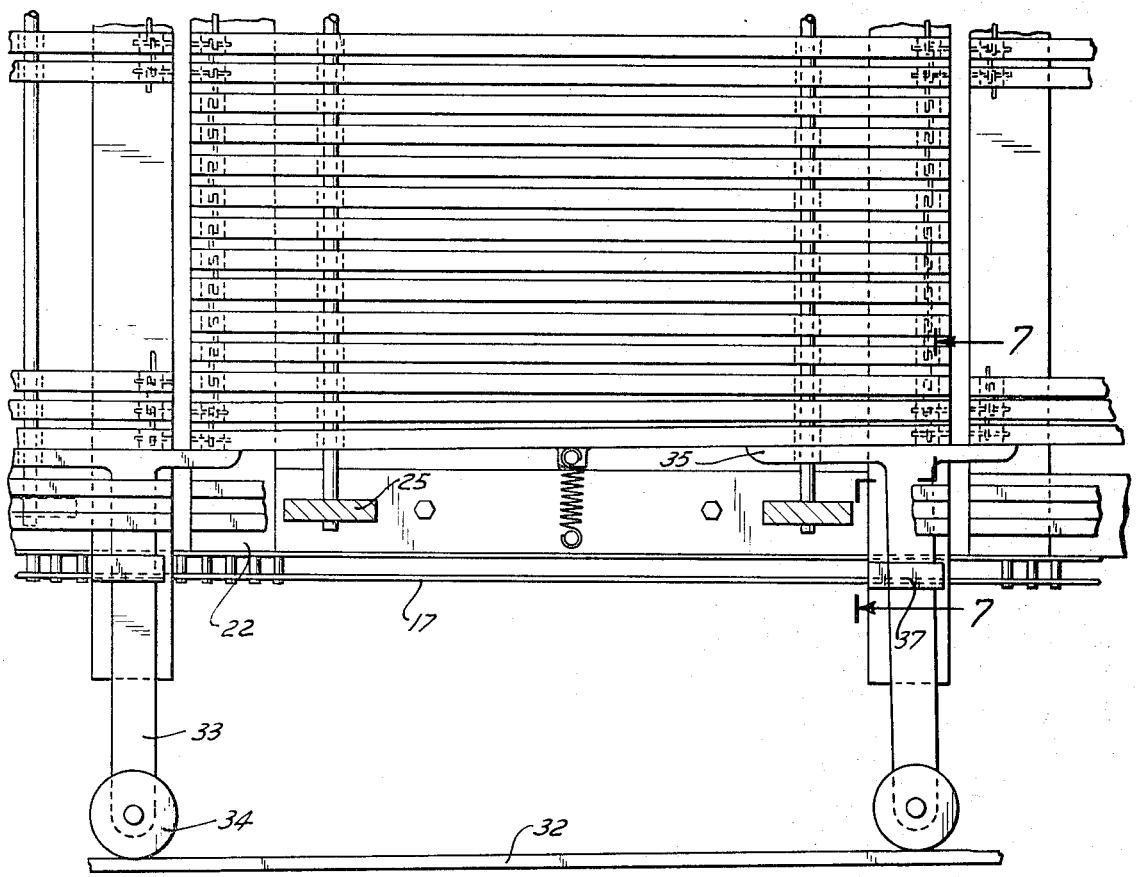
FIG. 6 is a fragmentary plan view illustrating the ribs partially collapsed.
Figure 7:
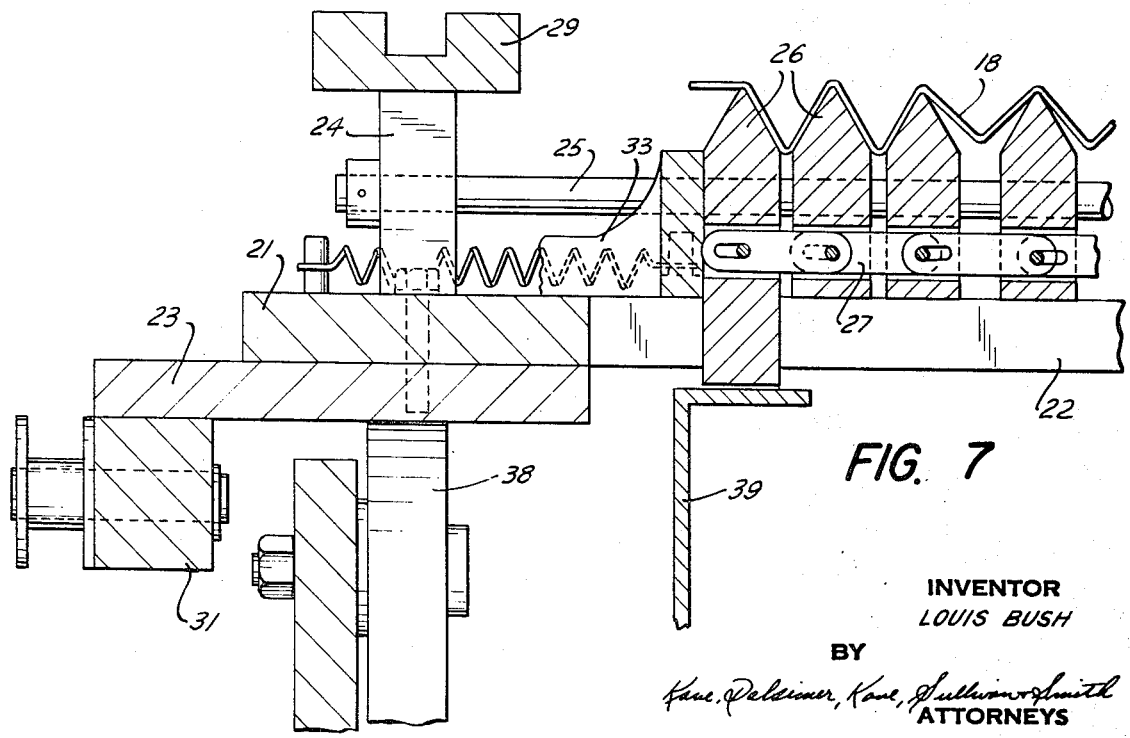
FIG. 7 is a partial end section taken along the line 7—7 of FIGS. 1 and 6.
Figure 8:
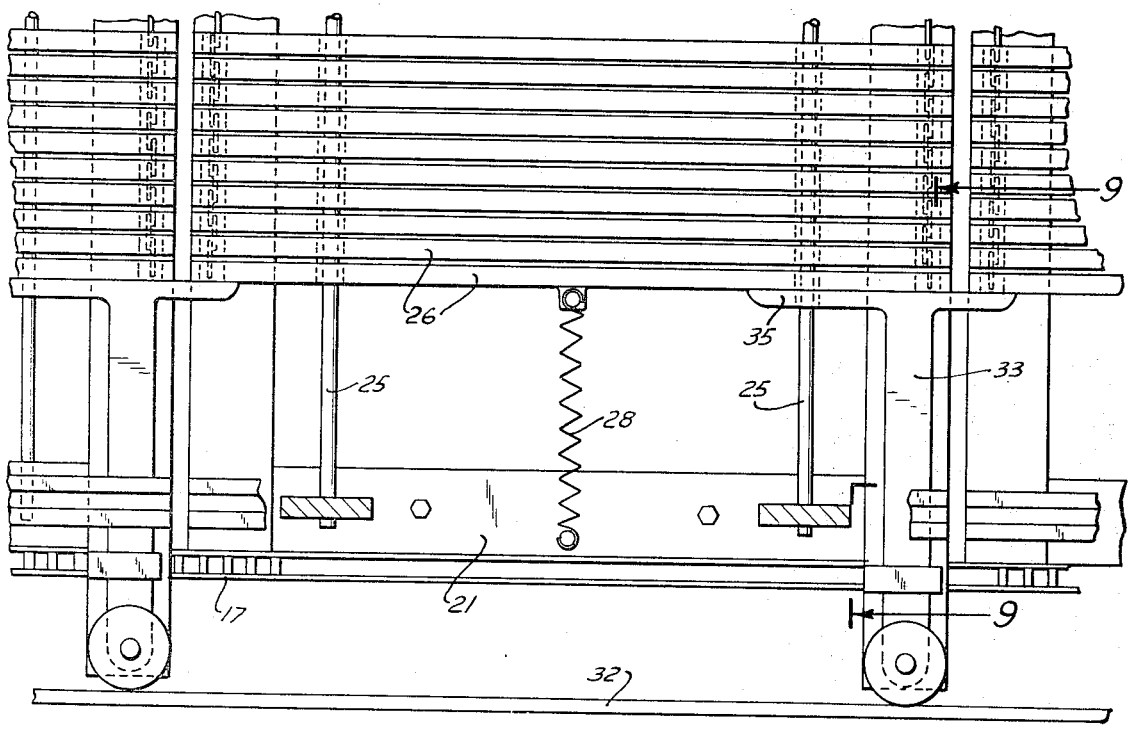
FIG. 8 is a fragmentary plan view illustrating the ribs in their collapsed position.

The structural details of the corrugating machine of the present invention are more particularly illustrated in FIGS. 3-9. Referring specifically to the structure of a typical belt segment 16, FIGS. 4, 6 and 8 are fragmentary plan views showing its configuration during various stages of the corrugating operation. It will be understood that each segment is identical to every other segment. Also, while the above views illustrate the structure at only one edge of the segment, it will be appreciated that the opposite edge may be identical.

Each segment 16 is supported by a rectangular frame comprising two edge members 21 positioned at the opposite edges, and two side members 22 positioned at the opposite sides. (Thus in the illustrated embodiment, the term "edge" refers to the two short sides of the rectangle, and the term "side" refers to the two long sides.) The members 21 and 22 lie in the same plane and are secured to a guide support 23 which underlies both members 21 and 22 along each edge.

Two brackets 24 are mounted on each member 21, each bracket supporting a rod 25 which extends across the segment to a corresponding bracket on the opposite edge member. A plurality of parallel ribs 26 are carried by each segment 16 and are retained thereto by the two rods 25 which pass through two apertures in each rib. By design, each rib 26 is substantially aligned with the corresponding rib of the two longitudinally adjacent segments at all points along the length of the upper surface of the machine, and is spaced a relatively short distance therefrom.

Figure 9:
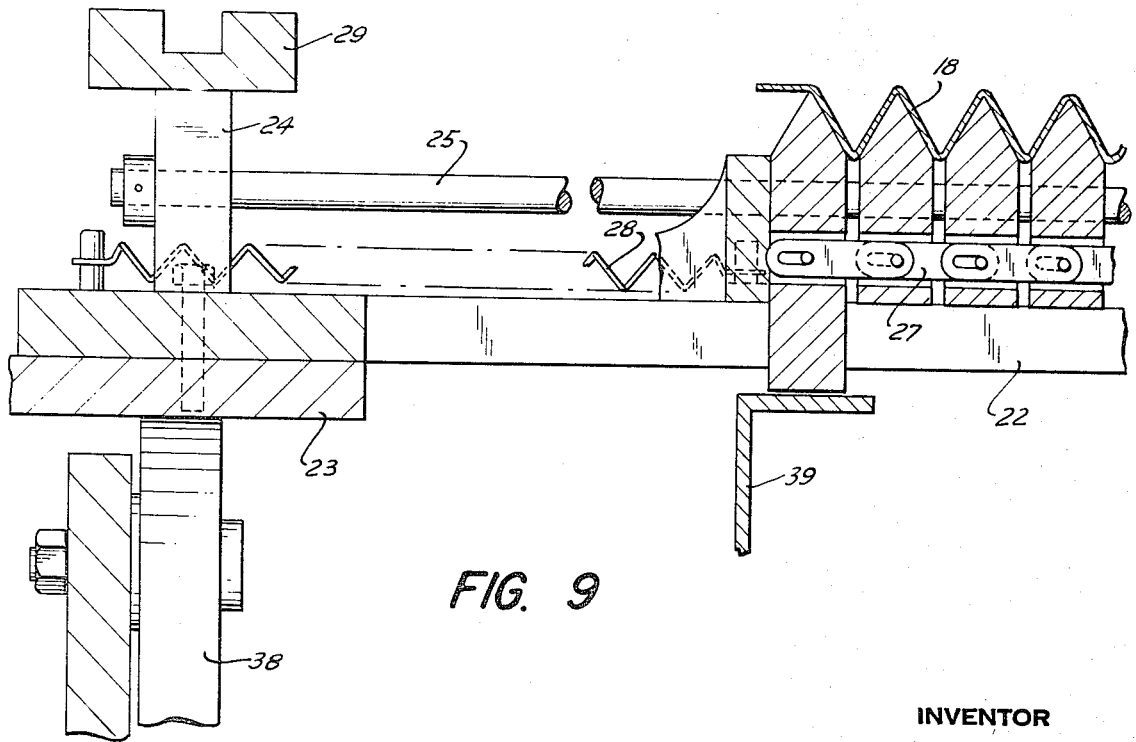
FIG. 9 is a partial end section taken along the line 9—9 of FIGS. 1 and 8.

The ribs 26 are interconnected by means of linkages 27 which have a pin-and-slot arrangement to permit the transverse spacing between the adjacent ribs to be adjusted between an open or extended position as seen in FIGS. 3 and 5, and a collapsed position as seen in FIG. 9. A spring 28 is connected between the outermost rib 26 and the edge member 21 and will, in the absence of a camming force as hereinafter described, maintain the ribs in their extended position.

The particular number of ribs 26 carried by each segment will, of course, vary depending upon the width of the paper to be corrugated. However, for purposes of example, the use of sixty ribs has been found to be satisfactory for a machine having an upper surface width of approximately 43 inches.

Each segment 16 further includes a return support 29 which is positioned above and parallel to the edge member 21, and which is connected to the two brackets 24. Also, a pair of spaced chain mounts 31 are secured to the guide support 23 for the purpose of forming a connection to the chain 17. The two chain mounts 31 must be properly distanced from each other such that the intermediate chain length will have sufficient play to permit negotiation of the two sprockets.

The spacing of the ribs 26 is controlled by a cam 32 mounted along each edge of the machine, and the associated cam followers 33. The cams 32 are mounted on the frame at distance spaced from the edge of the belt 15 and in substantially the same plane as the horizontal upper surface. A cam follower 33 is secured to each edge of the segment 16, and comprises a roller 34 at one end and a T-shaped abutment 35 at the other. The abutment 35 is adapted to engage the outermost rib 26 as shown in FIGS. 4, 6, and 8, while the roller 34 is adapted to engage and follow the cam 32 at the belt moves from the front to the rear of the machine. One side of the abutment 35 has an aperture for receiving a rod 25 and is thereby retained to the segment 16. The opposite side of the abutment 35 is only sufficiently long to engage a portion of the outermost rib of the adjacent segment. To further support the cam follower, an overlying guide 37 may be positioned on an extension of the side member 22.

By engaging the two ends of the two outermost ribs on the adjacent segments 16, the abutment 35 along with the spring 28 effectively retains the alignment of these ribs during the collapsing operation. The remaining ribs of adjacent segments will maintain their longitudinal alignment during the initial portion of the collapsing operation by reason of the frictional contact with the side members 22 and the rods 25. Since the ends of these ribs will be acted upon by the camming force at substantially the same time, their longitudinal alignment will be maintained throughout the collapsing operation.

The manner in which the belt 15 is supported by the frame 10 is best illustrated in FIG. 3. At the upper surface, a number of roller bearings 38 are positioned to engage the guide supports 23 of each segment 16 along the length of the machine. To provide additional support in the transverse direction, one or more additional bearings 38' may be positioned intermediate the edges of the segment 16 to engage a complementary centering track 36. When a segment reaches the sprocket, the belt is rotated to the inverted position illustrated in the lower portion of FIG. 3. Here, the bearings 40 support the segments by engaging the return support 29 at each edge.

The frame 10 also houses a number of vacuum trays 39 which are positioned immediately below the horizontal upper surface and which extend for a substantial portion of the length of the machine. The trays are positioned such that their edges are in close proximity to the outermost rib of each segment. As will be noted from FIGS. 5, 7 and 9, the edges of the trays follow the inward movement of the ribs as the ribs move from their extended to their collapsed position. The outermost rib may also have an extended depth betwen the two side members 22 to preserve the vacuum along the edge of each segment. Each tray 39 is connected to a conventional vacuum source which has not been illustrated.

To set the machine in operation, one of the sprockets is rotated by a conventional power mechanism (not shown). The rotating sprocket drives the chain 17 which, by reason of its connection to each segment, causes the rotational movement of the belt 15 as well as the opposite sprocket.

The paper 18 is fed to the horizontal upper surface from the Fourdrinier machine or the associated drying apparatus at the front end of the corrugating machine. The paper at this position may have a relatively high moisture content which varies in amount depending on its particular composition as well as the extent of preliminary drying. The paper 18 is supported throughout the length of the machine by the horizontal upper surface comprising the ribs 26 of the segments 16. By reason of the vacuum generated immediately below the ribs from the trays 39, the paper is drawn into firm engagement with the ribs.

At the front end of the machine, the ribs are in their extended position as shown in FIGS. 3-5. The spring 28 acts to maintain the extended relationship by drawing on the outermost rib, which in turn acts through the linkages 27 on the remaining ribs. After a suitable distance along the length of travel, the cams 32 on each side of the machine gradually close, causing the cam followers 33 to reduce the spacing between the ribs. At an intermediate position such as that shown in FIGS. 6-7, it will be seen that the outermost ribs have collapsed while the inner ribs remain separated. The spacing at full collapse is shown in FIGS. 8-9. The particular distance of overall rib collapse will depend on a number of factors including the desired final shape of the corrugations and the particular composition of the paper. Referring again to an exemplary machine having an initial upper surface width of 43 inches, a collapse to a total width of 30 inches has been found to be generally satisfactory.

The manner in which the corrugations are formed in the paper will now be apparent from FIGS. 5, 7 and 9. During collapse of the ribs, the paper is drawn by the vacuum into the area between adjacent ribs whereby the corrugations are formed. As the belt continues toward the rear of the machine, the ribs remain in the collapsed position until the rear sprocket is reached. It will be noted that the middle rib on each segment will not move during the collapsing operation since the adjacent ribs will approach from both directions. It is therefore possible to secure that rib to one of the rods 25 by a suitable set screw arrangement (not illustrated) to insure the proper transverse alignment of the ribs on adjacent segments.

During the return of the segments from the rear to the front of the machine, the cam followers 33 are released to permit the ribs to be extended by the springs 28. The segments are carried and guided in this position by the lower roller bearings 40 which engage the return supports 29. Suitable guide means (which have not been illustrated) may be positioned about the sprocket to insure that the bearings 40 will properly be positioned in the support 29.

If a moist paper is being corrugated on the machine, it may be desirable to dry the paper by applying heat from above the upper surface for the purpose of giving the corrugations a permanent set. This may be accomplished by installing any conventional heating structure (which has not been illustrated) above the upper surface of the belt. The particular length of the heating application will be controlled by several practical considerations such as the speed of the machine and the particular composition of the paper. In most cases however, it will be desirable to apply the heat at least from the point at which the ribs are fully collapsed to a point adjacent the rear end of the machine.

It has been found that some materials tend to adhere to the ribs 26 after the corrugations have been formed and the material has dried. To facilitate removal of such material at the rear end of the machine in such cases, an air stream may be directed at the undersurface of the material from beneath the ribs. The structure for accomplishing this purpose is of conventional design and has therefore not been illustrated.

Figure 10:
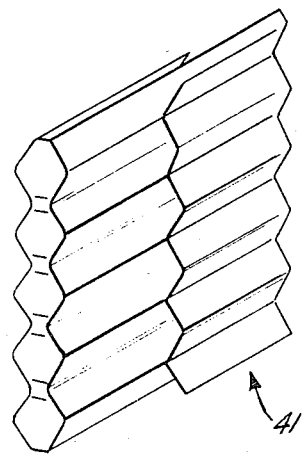
FIG. 10 is a perspective view of one embodiment of a folded paper filter element formed by the subject invention.

FIG. 10 illustrates a portion of a folded filter element 41 formed from paper which has been corrugated on the machine of the subject invention. It will be seen that the cross-sectional shape of the corrugations may be characterized as a plurality of intersecting substantially planar surfaces. This particular cross-sectional shape results from the corresponding cross-sectional shape of the upper portion of each rib 26 as seen for example in FIG. 9.

Figure 11:
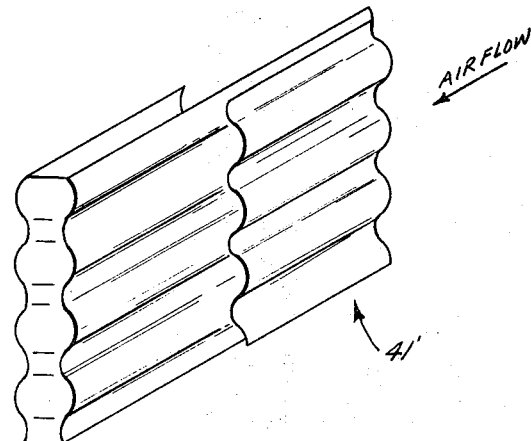
FIG. 11 is a perspective view of another embodiment of a folded paper filter element.
Figure 12:
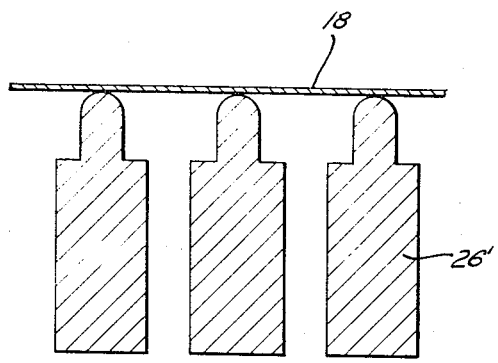
FIG. 12 is an end section illustrating an alternate rib configuration, the ribs being in their extended position.
Figure 13:
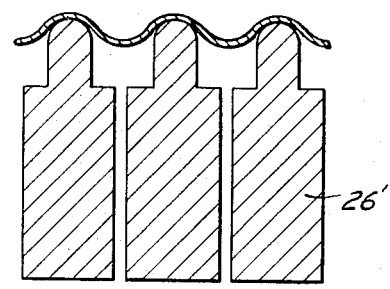
FIG. 13 illustrates the ribs of FIG. 12 in their collapsed position.

It will be appreciated that by altering the cross-sectional shape of the upper portion of the ribs 26, the resulting cross-sectional shape of the corrugations in the paper may also be altered. For example, the ribs 26′ as illustrated in cross-section in FIGS. 12–13, present a generally rounded or oval surface to the supported paper 18. Upon the collapse of the ribs 26′ to the position shown in FIG. 13, a corrugation having generally rounded edges is imparted to the paper. A filter element 41′ of paper corrugated by this arrangement is shown in FIG. 11. Thus by changing the configuration of the ribs, the particular shape of the corrugations may be easily varied. With respect to filter paper, these different configurations often give rise to somewhat different filtering characteristics.

Figure 14:
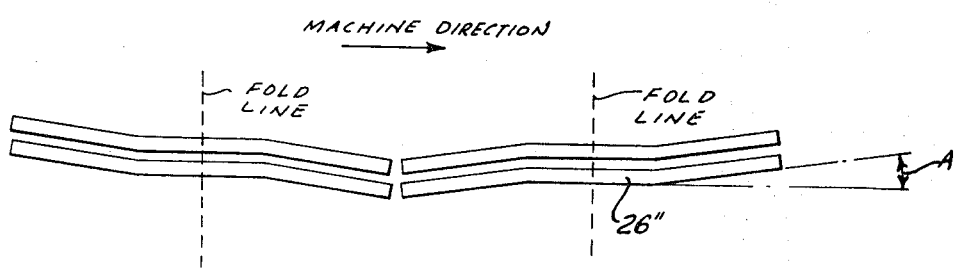
FIG. 14 is a schematic representation, in plan view, illustrating a further alternate configuration of the ribs.

FIG. 14 illustrates an additional manner in which the shape of the ribs may be varied to alter the configuration of the corrugation in the paper. Here the ribs 26″, shown schematically in plan view, each comprise three sections which are transversely offset. The middle section of each rib is generally aligned with the direction of movement of the belt. The two end sections however, are oppositely offset from this direction by an amount indicated by angle A. The ends of corresponding ribs 26″ on adjacent segments are contiguous to thereby impart a herringbone configuration to the corrugations which has been found to be desirable when the paper is utilized in filters of the type described above. When the filter paper is folded along the indicated fold lines, it will be noted that the corrugations in the middle of the filter pack will be crossed while the corrugations at either end will be parallel. The resulting air flow characteristic has been found to increase filtering efficiency and/or decrease the resistance to air flow in certain applications. While the angle A may be widely varied depending on the particular composition of the material to be corrugated, an angle of approximately 8° has been found to be satisfactory in many applications.

While the present invention has been illustrated and described by reference to a particular machine for corrugating paper of the type used in air filters, it should be understood that the scope of the invention is not limited thereto. The scope is to be determined by that of the appended claims only.

I claim:
1. An apparatus for corrugating a sheet of pliable material including:
 a surface for supporting said sheet comprising a segmented endless belt with each segment having a plurality of transversely spaced parallel ribs;
 each segment of ribs being adjustable to permit the spacing between the transversely adjacent ribs of each segment to be varied between an extended and a collapsed positions;
 vacuum means at the underside of said surface for drawing said sheet into firm engagement with said ribs;
 and means to reduce the transverse spacing between said ribs, whereby said sheet is drawn into the area between adjacent ribs to form corrugations therein which facilitate later desired pleating of the corrugated sheet.
2. The apparatus as defined in claim 1 further including means above said surface for heating said pliable material.
3. An apparatus for corrugating a continuous sheet of pliable material comprising:
 a frame;
 a segmented endless belt mounted for rotation upon said frame, the upper portion of said belt forming a substantially horizontal surface;
 means for rotating said belt such that said belt continuously moves along said horizontal surface;
 means for feeding a continuous sheet of pliable material onto said horizontal surface such that said pliable material is supported by said belt and is moved along said horizontal surface therewith;
 each segment of said belt having a plurality of transversely interconnected parallel ribs, each rib being generally aligned with the direction of movement of said belt and with the corresponding ribs of the longitudinally adjacent segments to form a plurality of line contact edges along the length of said horizontal surface;
 said transverse interconnection being adjustable to permit the spacing between the transversely adjacent ribs of each segment to be varied between an extended and a collapsed position;
 means on said frame to control the spacing of said ribs between said extended and collapsed positions such that the spacing progressively decreases over at least a portion of the distance as the belt moves along said horizontal surface;
 vacuum means along the underside of said horizontal surface to draw the supported pliable material into firm engagement with said ribs;
 whereby the supported pliable material is drawn into the area between the transversely adjacent ribs as the spacing progressively decreases, to form longitudinal corrugations therein.
4. The apparatus as defined in claim 3 wherein the cross-sectional configuration of the upper portion of each rib comprises two intersecting substantially planar surfaces.

5. The apparatus as defined in claim 3 wherein the cross-sectional configuration of the upper portion of each rib comprises a generally oval configuration.

6. The apparatus as defined in claim 3 wherein each rib of said belt comprises three longitudinal sections, the middle section being aligned with the direction of belt movement and the two end sections being oppositely offset from said direction.

7. The apparatus as defined in claim 3 wherein said pliable material is moist paper, and said apparatus further includes drying means to reduce the moisture content of said paper as the paper is moved along said horizontal surface, said drying means being positioned above said surface along a predetermined length of surface and directed toward said surface for drying said paper.

8. The apparatus as defined in claim 3 wherein the means on said frame to control the spacing of said ribs includes a camming surface mounted on said frame and a cam follower mounted on each segment of said belt, said cam follower being adapted to engage said ribs from a transverse direction to effect the collapse thereof.

9. The apparatus as defined in claim 8 wherein said means on said frame to control the spacing of said ribs further includes means for returning said ribs from their collapsed to their extended position.

10. The apparatus as defined in claim 9 further including means to direct an air stream at the under side of said horizontal surface to facilitate removal of said pliable material, and said means to direct an air stream being located adjacent the end of the machine at which the pliable material is removed after it has been corrugated.

References Cited

UNITED STATES PATENTS

| | | | |
|---|---|---|---|
| 2,193,052 | 3/1940 | Atwater | 264—88 X |
| 3,178,494 | 4/1965 | Tisdale | 264—90 |
| 3,179,726 | 4/1965 | Perry | 264—90 |

ROBERT F. WHITE, Primary Examiner

J. H. SILBAUGH, Assistant Examiner

U.S. Cl. X.R.

156—588, 593, 594; 162—205, 296, 362; 264—90, 286